US008812025B2

(12) United States Patent
Takahashi et al.

(10) Patent No.: US 8,812,025 B2
(45) Date of Patent: Aug. 19, 2014

(54) MOBILE TERMINAL AND CONTROL METHOD FOR MOBILE TERMINAL

(75) Inventors: Makoto Takahashi, Yokosuka (JP); Jun Hashimoto, Yokohama (JP); Kentaro Itagaki, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/634,277

(22) PCT Filed: Apr. 11, 2011

(86) PCT No.: PCT/JP2011/059005
§ 371 (c)(1),
(2), (4) Date: Sep. 12, 2012

(87) PCT Pub. No.: WO2011/129300
PCT Pub. Date: Oct. 20, 2011

(65) Prior Publication Data
US 2013/0005357 A1 Jan. 3, 2013

(30) Foreign Application Priority Data
Apr. 15, 2010 (JP) .................. 2010-094067

(51) Int. Cl.
H04W 24/00 (2009.01)

(52) U.S. Cl.
USPC .................... 455/456.1; 455/456.2; 455/456.6

(58) Field of Classification Search
USPC ................... 455/456.1, 456.2, 456.6
See application file for complete search history.

(56) References Cited

U.S. PATENT DOCUMENTS

| 7,016,687 B1 * | 3/2006 | Holland ...................... 455/456.1 |
| 7,209,753 B2 * | 4/2007 | Raith .......................... 455/456.1 |
| 2009/0098880 A1 * | 4/2009 | Lindquist .................... 455/456.1 |
| 2009/0262673 A1 * | 10/2009 | Hermersdorf ................. 370/310 |
| 2009/0271111 A1 | 10/2009 | Takanashi et al. |
| 2010/0033424 A1 * | 2/2010 | Kabasawa et al. ............ 345/156 |
| 2010/0255781 A1 * | 10/2010 | Wirola et al. ................. 455/41.2 |
| 2010/0277296 A1 * | 11/2010 | DeMille ...................... 340/426.1 |
| 2011/0239026 A1 * | 9/2011 | Kulik ............................ 713/324 |

FOREIGN PATENT DOCUMENTS

| JP | 2009 294000 | 12/2009 |
| WO | WO 2009/046767 A1 | 4/2009 |

OTHER PUBLICATIONS

Takahashi, M., "Technology Reports," NTT DOCOMO Technical Journal, vol. 17, No. 4, pp. 2-12, (Jan. 1, 2010) (with partial English translation).

(Continued)

Primary Examiner — Jinsong Hu
Assistant Examiner — Jean Chang
(74) Attorney, Agent, or Firm — Oblon, Spivak, McClelland, Maier & Neustadt, L.L.P.

(57) ABSTRACT

A positioning portion does not identify a position of a mobile terminal in a case in which a stationary continuation determiner determines that the mobile terminal has continued to be stationary during a period, the positioning portion identifies the position of the mobile terminal in a case in which the stationary continuation determiner determines that the mobile terminal has not continued to be stationary during the period and in which a traveling condition determiner determines that the mobile terminal is in traveling condition, and the positioning portion does not identify the position of the mobile terminal in a case in which the stationary continuation determiner determines that the mobile terminal has not continued to be stationary during the period and in which the traveling condition determiner determines that the mobile terminal is in a stationary condition.

8 Claims, 8 Drawing Sheets

(56) References Cited

OTHER PUBLICATIONS

International Search Report Issued Jul. 19, 2011 in PCT/JP11/59005 Filed Apr. 11, 2011.

Japanese Office Action issued on Jul. 10, 2012 in JP 2010 094067 Filed Apr. 15, 2010 (with English translation).
Extended European Search Report issued Jun. 27, 2014.

* cited by examiner

MOBILE TERMINAL AND CONTROL METHOD FOR MOBILE TERMINAL

TECHNICAL FIELD

The present invention relates to mobile terminals and to control methods for mobile terminals.

BACKGROUND ART

Techniques in which a mobile terminal, such as a cellular phone handset, which communicates using a mobile communication network, identifies the position of the mobile terminal itself using GPS (Global Positioning System) are known (e.g., Patent Document 1).

The applicant has developed, in Japan, techniques in which a mobile terminal periodically and automatically identifies a position of the mobile terminal itself and notifies an information service provision apparatus of the position of the mobile terminal. Based on the position of the mobile terminal, the information service provision apparatus can transmit information relevant to an area including the position, e.g., weather forecast for the area, to the mobile terminal.

CITATION LIST

Patent Document

Patent Document 1: Japanese Patent Application Laid-Open Publication No. 2009-294000

SUMMARY OF INVENTION

Technical Problem

However, it is not necessary to periodically and automatically identify the position of the mobile terminal itself when the mobile terminal is not in motion. There is a problem in that power consumption of the mobile terminal will increase if the mobile terminal identifies its position in such a case.

Accordingly, the present invention provides a mobile terminal that identifies a position of the mobile terminal with low power consumption, and a control method therefor.

Solution to Problem

In accordance with an aspect of the present invention, a mobile terminal includes: a positioning portion configured to identify a position of the mobile terminal repetitively; a stationary continuation determiner configured to determine whether or not the mobile terminal has continued to be stationary during a period including current time; and a traveling condition determiner configured to determine whether the mobile terminal is in a stationary condition or is in a traveling condition. The positioning portion does not identify the position of the mobile terminal in a case in which the stationary continuation determiner determines that the mobile terminal has continued to be stationary during the period, the positioning portion identifies the position of the mobile terminal in a case in which the stationary continuation determiner determines that the mobile terminal has not continued to be stationary during the period and in which the traveling condition determiner determines that the mobile terminal is in a traveling condition, and the positioning portion does not identify the position of the mobile terminal in a case in which the stationary continuation determiner determines that the mobile terminal has not continued to be stationary during the period and in which the traveling condition determiner determines that the mobile terminal is in a stationary condition.

According to the present invention, the position of the mobile terminal is not identified in a case in which the mobile terminal has continued to be stationary, without reference to the determination results of the traveling condition determiner. As a result, unnecessary positioning determination is not executed, so that power consumption of the mobile terminal can be reduced. The position of the mobile terminal is identified in a case in which the mobile terminal has not continued to be stationary and in which it is determined that the mobile terminal is in traveling condition, that is, in which the present position is changed.

In a preferred embodiment, the traveling condition determiner includes: a visited zone change determiner configured to determine whether or not a visited zone in which the mobile terminal is located has changed during the period; a traveling distance calculator configured to calculate a traveling distance of the mobile terminal during the period; and a comparison determiner configured to determine whether or not the traveling distance that the traveling distance calculator has calculated is greater than a threshold. The positioning portion may identify the position of the mobile terminal in a case in which the stationary continuation determiner determines that the mobile terminal has not continued to be stationary during the period; and in which the visited zone change determiner determines that the visited zone in which the mobile terminal is located has changed during the period or in which the comparison determiner determines that the traveling distance during the period is greater than the threshold, and the positioning portion may not identify the position of the mobile terminal in a case in which the stationary continuation determiner determines that the mobile terminal has not continued to be stationary during the period, in which the visited zone change determiner determines that the visited zone in which the mobile terminal is located is not changed during the period, and in which the comparison determiner determines that the traveling distance during the period is equal to or lower than the threshold.

In this embodiment, traveling condition is determined under the two criteria, that is, whether the visited zone changes and whether the traveling distance of the mobile terminal is greater than the threshold. As a result, it is precisely determined that the mobile terminal is in traveling condition, even in a case in which the visited zone changes, whereas the mobile terminal has not moved over a long distance, or in a case in which the visited zone is not changed, whereas the mobile terminal has moved over a long distance.

In general, even if the mobile terminal is completely stationary, there is a case in which the visited zone of the mobile terminal changes (i.e., what is called "flapping" of the visited zone occurs) according to variation of radio wave conditions due to geological formations and terrestrial objects. In such a case, although it is not necessary to execute positioning determination as the mobile terminal has not moved, it is determined that the mobile terminal has moved based on the change of the visited zone, so that unnecessary positioning determination is executed.

However, according to this embodiment, as unnecessary positioning determination is not executed in such a case, power consumption can be reduced. That is, even if the traveling condition determiner including the visited zone change determiner determines that the mobile terminal is in traveling condition due to the flapping, the identification of the mobile terminal is not executed in a case in which the stationary continuation determiner determines that the mobile terminal has continued to be stationary. Consequently, unnecessary positioning determination is not executed, so that power consumption of the mobile terminal can be reduced.

According to this embodiment, even if it is determined that the mobile terminal has not continued to be stationary, the identification of the mobile terminal is not executed in a case in which the visited zone is not changed and in which the traveling distance is lower than the threshold, that is, in a case in which it is not necessary to execute new positioning determination because the traveling distance of the mobile terminal is short. Consequently, unnecessary positioning determination is not executed, so that power consumption of the mobile terminal can be reduced.

In another preferred embodiment, the traveling condition determiner includes: a visited zone change determiner configured to determine whether or not a visited zone in which the mobile terminal is located changes during the period. The positioning portion may identify the position of the mobile terminal in a case in which the stationary continuation determiner determines that the mobile terminal has not continued to be stationary during the period and in which the visited zone change determiner determines that the visited zone in which the mobile terminal is located changes during the period, and the positioning portion may not identify the position of the mobile terminal in a case in which the stationary continuation determiner determines that the mobile terminal has not continued to be stationary during the period and in which the visited zone change determiner determines that the visited zone in which the mobile terminal is located is not changed during the period.

In general, even if the mobile terminal is completely stationary, there is a case in which the visited zone of the mobile terminal changes (i.e., what is called "flapping" of the visited zone occurs) according to variation of radio wave conditions due to geological formations and terrestrial objects. Due to the change of the visited zone, it is determined that the mobile terminal has moved. As a result, positioning determination is executed. However, the positioning determination is not necessary because the mobile terminal has not actually moved.

However, according to this embodiment, as unnecessary positioning determination is not executed in such a case, power consumption can be reduced. That is, even if the traveling condition determiner including the visited zone change determiner determines that the mobile terminal is in traveling condition due to the flapping, the identification of the mobile terminal is not executed in a case in which the stationary continuation determiner determines that the mobile terminal has continued to be stationary. Consequently, unnecessary positioning determination is not executed, so that power consumption can be reduced.

In another preferred embodiment, the traveling condition determiner includes: a traveling distance calculator configured to calculate a traveling distance of the mobile terminal during the period; and a comparison determiner configured to determine whether or not the traveling distance that the traveling distance calculator has calculated is greater than a threshold. The positioning portion may identify the position of the mobile terminal in a case in which the stationary continuation determiner determines that the mobile terminal has not continued to be stationary during the period and in which the comparison determiner determines that the traveling distance during the period is greater than the threshold, and the positioning portion may not identify the position of the mobile terminal in a case in which the stationary continuation determiner determines that the mobile terminal has not continued to be stationary during the period and in which the comparison determiner determines that the traveling distance during the period is equal to or lower than the threshold.

According to this embodiment, even if it is determined that the mobile terminal has not continued to be stationary, the identification of the mobile terminal is not executed in a case in which the traveling distance is lower than the threshold, that is, in a case in which it is not necessary to execute new positioning determination because the traveling distance of the mobile terminal is short. Consequently, unnecessary positioning determination is not executed, so that power consumption of the mobile terminal can be reduced.

Preferably, the mobile terminal further includes: a receiver configured to receive information which an information service provision apparatus sends to the mobile terminal via a mobile communication network, the information adjusted to a present position of the mobile terminal; and a transmitter configured to repetitively transmit a signal which represents the position of the mobile terminal which the positioning portion has identified to the information service provision apparatus. The transmitter may not transmit the signal that represents the position of the mobile terminal to the information service provision apparatus in a case in which the positioning portion does not identify the position of the mobile terminal, and the transmitter may transmit the signal that represents the position of the mobile terminal to the information service provision apparatus in a case in which the positioning portion identifies the position of the mobile terminal.

In this instance, the position of the mobile terminal is not notified to the information service provision apparatus in a case in which the mobile terminal does not move and the position of the mobile terminal is not identified. As a result, power consumption for position notification of the mobile terminal can be reduced and traffic load of the network can also be reduced.

In accordance with an aspect of the present invention, a control method for a mobile terminal includes: identifying a position of the mobile terminal repetitively; determining whether or not the mobile terminal has continued to be stationary during a period including current time; determining whether the mobile terminal is in a stationary condition or is in a traveling condition; not identifying the position of the mobile terminal in a case in which the stationary continuation determiner determines that the mobile terminal has continued to be stationary during the period; identifying the position of the mobile terminal in a case in which it is determined that the mobile terminal has not continued to be stationary during the period and in which it is determined that the mobile terminal is in traveling condition; and not identifying the position of the mobile terminal in a case in which it is determined that the mobile terminal has not continued to be stationary during the period and in which it is determined that the mobile terminal is in a stationary condition.

DESCRIPTION OF EMBODIMENTS

First Embodiment

Figure 1:
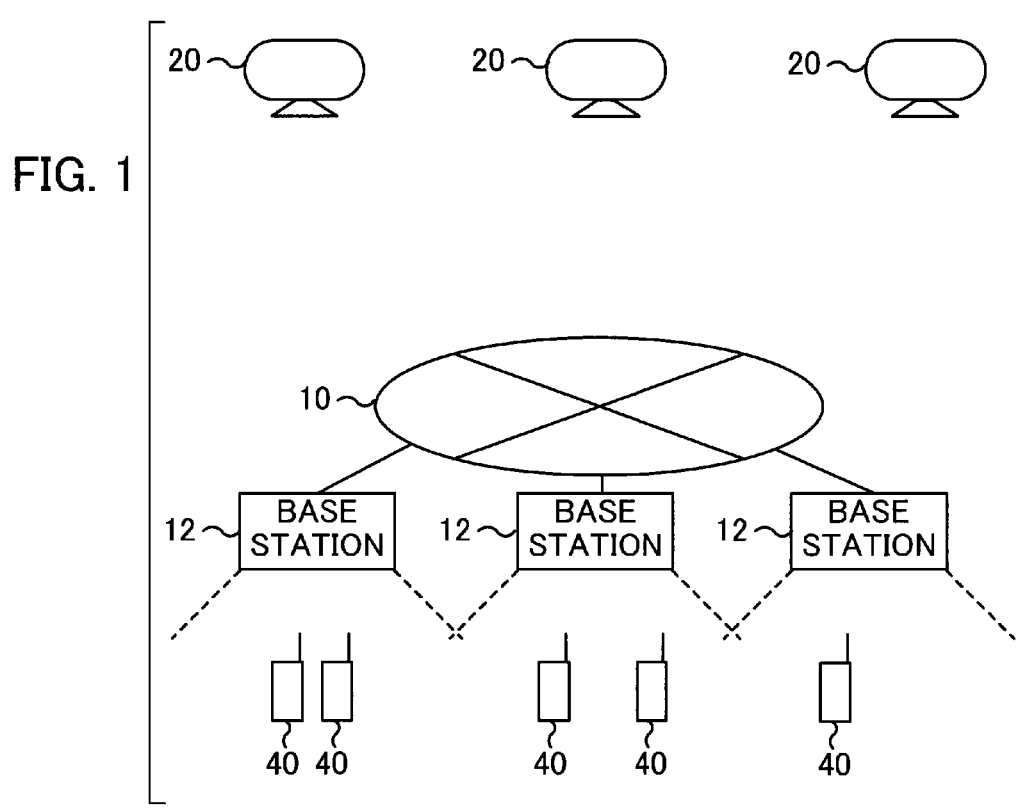
FIG. 1 is a schematic view showing the entire communication system in which a mobile terminal according to a first embodiment to a third embodiment of the present invention is used.

Reference is made to the attached figures to illustrate a first embodiment of the present invention. As shown in FIG. 1, an entire communication system in which a mobile terminal according to this embodiment is used includes a mobile communication network 10 and a plurality of mobile terminals 40 capable of communicating with the mobile communication network 10. The mobile communication network 10 includes a plurality of base stations 12, each of which communicates with a mobile terminal 40 located on a cell of the base station.

Each of the mobile terminals 40 is, for instance, a cellular phone handset or another terminal capable of using the mobile communication network. Each of the mobile terminals 40 can receive time signals from a plurality of (e.g., four) GPS satellites to execute positioning determination and can identify a position of the mobile terminal 40 itself based on those time signals.

Figure 2:
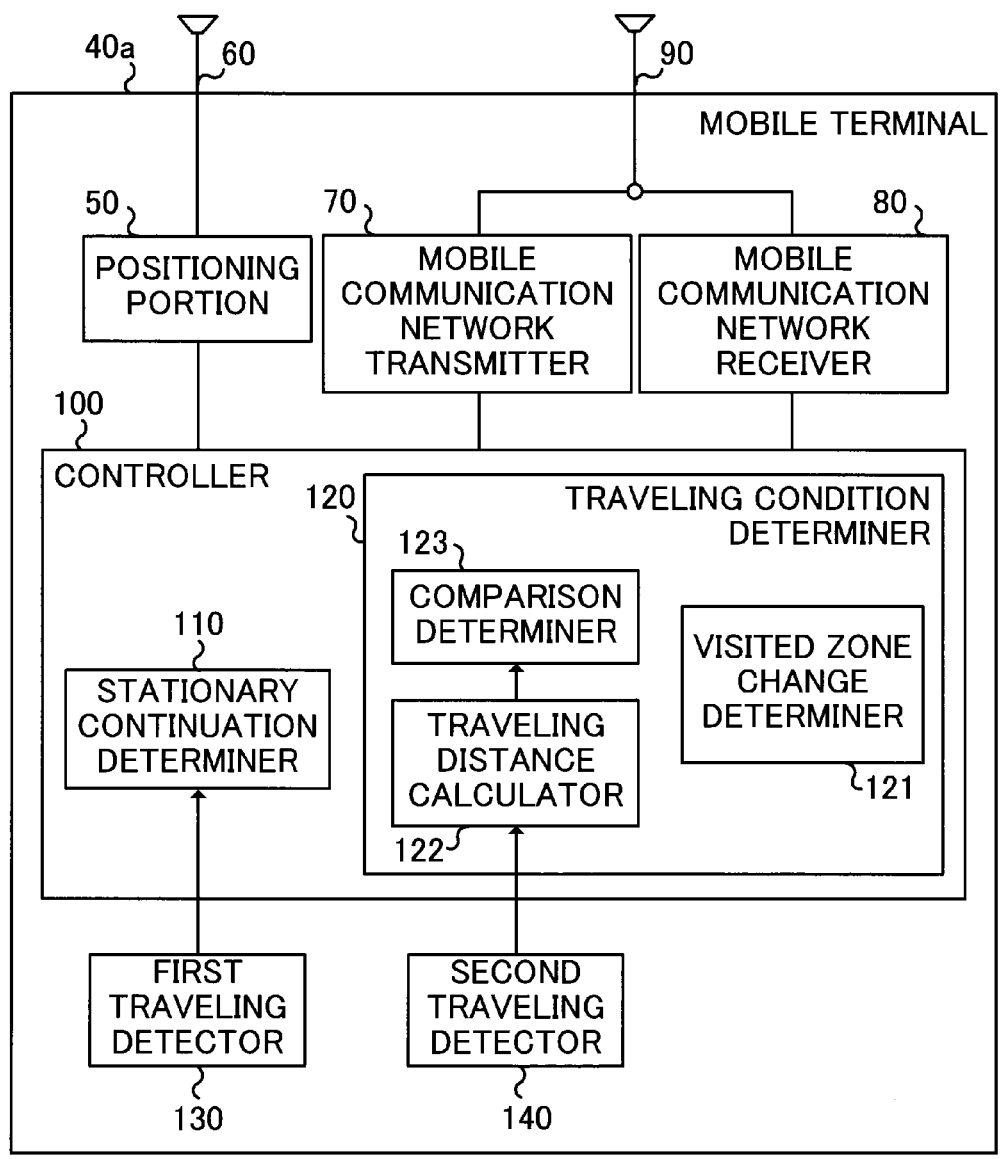
FIG. 2 is a block diagram showing a structure of the mobile terminal of the first embodiment.

As shown in FIG. 2, a mobile terminal 40a includes a mobile communication network transmitter 70, a mobile communication network receiver 80, a mobile communication network antenna 90, and a controller 100. The mobile communication network transmitter 70 transmits signals to other communication apparatuses via the mobile communication network 10 with the antenna 90 under control of the controller 100. The mobile communication network receiver 80, under control of the controller 100, processes signals that are received from other communication apparatuses via the mobile communication network 10 with the antenna 90. The controller 100 controls processing of the transmission signals with the mobile communication network transmitter 70 and processing of the reception signals with the mobile communication network receiver 80 in accordance with communication control programs. A CPU (Central Processing Unit) that is included in the mobile terminal 40a, which is not shown, executes computer programs and operates in accordance with these computer programs to provide the mobile communication network transmitter 70, the mobile communication network receiver 80, and the controller 100.

The controller 100 includes a stationary continuation determiner 110 and a traveling condition determiner 120. The traveling condition determiner 120 includes a visited zone change determiner 121, a traveling distance calculator 122, and a comparison determiner 123. The CPU (not shown) included in the mobile terminal 40a executes computer programs and operates in accordance with these computer programs to provide those elements included in the controller 100. Details of these elements are described later.

The mobile terminal 40a further includes a positioning portion 50 and a positioning antenna 60. The positioning portion 50 receives time signals from a plurality of the GPS satellites 20 through the positioning antenna 60. In the presence of permission by the controller 100, the positioning portion 50 identifies a present position of the mobile terminal 40a itself based on these time signals.

The positioning portion 50 may identify the present position of the mobile terminal 40a based on position information and the time signals received from the GPS satellites 20 (autonomous GPS positioning). Otherwise, the positioning portion 50 may identify the present position of the mobile terminal 40a based on position information of the GPS satellites 20 from a satellite position information server (not shown) via the mobile communication network 10 with the mobile communication network receiver 80 and the time signals received from the GPS satellites 20 (assisted GPS positioning).

The CPU (not shown) included in the mobile terminal 40a executes computer programs and operates in accordance with these computer programs to provide the positioning portion 50.

The mobile terminal 40a further includes a first traveling detector 130 and a second traveling detector 140. The first traveling detector 130 is a device to detect whether the mobile terminal 40 is stationary or not, for instance, an acceleration sensor to measure acceleration on the mobile terminal 40a. The second traveling detector 140 is a device to detect a state of motion of the mobile terminal 40a, for instance, an acceleration sensor to measure acceleration on the mobile terminal 40a, a geomagnetism sensor to measure geomagnetism at the position of the mobile terminal 40a, or a combination of them. The first traveling detector 130 and the second traveling detector 140 can be the same acceleration sensor.

The stationary continuation determiner 110 determines whether or not the mobile terminal 40a has continued to be stationary during a period including the current time. If the first traveling detector 130 is an acceleration sensor, the stationary continuation determiner 110 determines continuation of quiescence based on acceleration detected by the first traveling detector 130. If the acceleration sensor is configured to enter a sleep state when the acceleration sensor has not detect acceleration, the stationary continuation determiner 110 can determine that the mobile terminal 40a has continued to be stationary in accordance with that the acceleration sensor is in the sleep state.

The visited zone change determiner 121 in the traveling condition determiner 120 determines whether a cell changes during a period including the current time. The cell is a visited zone in which the mobile terminal 40a is located. In other words, the visited zone change determiner 121 determines whether or not a base station with which the mobile terminal 40a is to communicate changes.

As described above, there is a case in which a visiting cell changes without traveling of the mobile terminal 40a. For example, in the vicinity of a border between cells, there is a small difference between reception intensities (reception qualities at a mobile terminal) of radio waves transmitted from respective base stations. Further, radio wave conditions vary constantly as a consequence of geological formations and terrestrial objects. Accordingly, the most suitable base station with which the mobile terminal 40a in the vicinity of the border between the cells communicates can change. As a result, there is a case in which a base station with which the mobile terminal 40a is to communicate changes without traveling of the mobile terminal 40a. That is, there is a case in which a visited zone of the mobile terminal 40a changes without traveling of the mobile terminal 40a.

The traveling distance calculator 122 in the traveling condition determiner 120 calculates a traveling distance based on traveling of the mobile terminal 40a detected by the second traveling detector 140. For example, if the second traveling detector 140 is an acceleration sensor, the traveling distance calculator 122 counts the number of steps of a user holding the mobile terminal 40a based on acceleration detected by the second traveling detector 140, and calculates the traveling distance by multiplying the number of the steps by a length of the user's stride which is stored in advance. After that, the comparison determiner 123 in the traveling condition determiner 120 compares the traveling distance of the mobile terminal 40a that the traveling distance calculator 122 has calculated with threshold Th. That is, the comparison determiner 123 determines whether or not the traveling distance is greater than a threshold Th.

In a case in which the stationary continuation determiner 110 determines that the mobile terminal 40a has continued to be stationary during a period including the current time, the controller 100 controls the positioning portion 50 not to identify the position of the mobile terminal 40a. This control is executed without reference to the determination results of the visited zone change determiner 121 and the comparison determiner 123 in the traveling condition determiner 120.

In a case in which the stationary continuation determiner 110 determines that the mobile terminal 40a has not continued to be stationary during a period including the current time, and in which the visited zone change determiner 121 determines that a cell in which the mobile terminal 40a is located changes during the period including the current time or in which the comparison determiner 123 determines that the traveling distance of the mobile terminal 40a during the period including the current time is greater than the threshold Th, that is, in a case in which the traveling condition determiner 120 determines that the mobile terminal 40a is in traveling condition, the controller 100 controls the positioning portion 50 to identify the position of the mobile terminal 40a. The positioning portion 50 receives GPS signals from the GPS satellites 20, identifies the position of the mobile terminal 40a based on the received GPS signals, and supplies the controller 100 with a signal showing the position.

In a case in which the stationary continuation determiner 110 determines that the mobile terminal 40a has not continued to be stationary during a period including the current time, in which the visited zone change determiner 121 determines that a cell in which the mobile terminal 40a is located is not changed during the period including the current time, and in which comparison determiner 123 determines that the traveling distance of the mobile terminal 40a during the period including the current time is equal to or lower than the threshold Th, that is, in a case in which the traveling condition determiner 120 determines that the mobile terminal 40a is in a stationary condition, the controller 100 controls the positioning portion 50 so as not to identify the position of the mobile terminal 40a.

Figure 3:
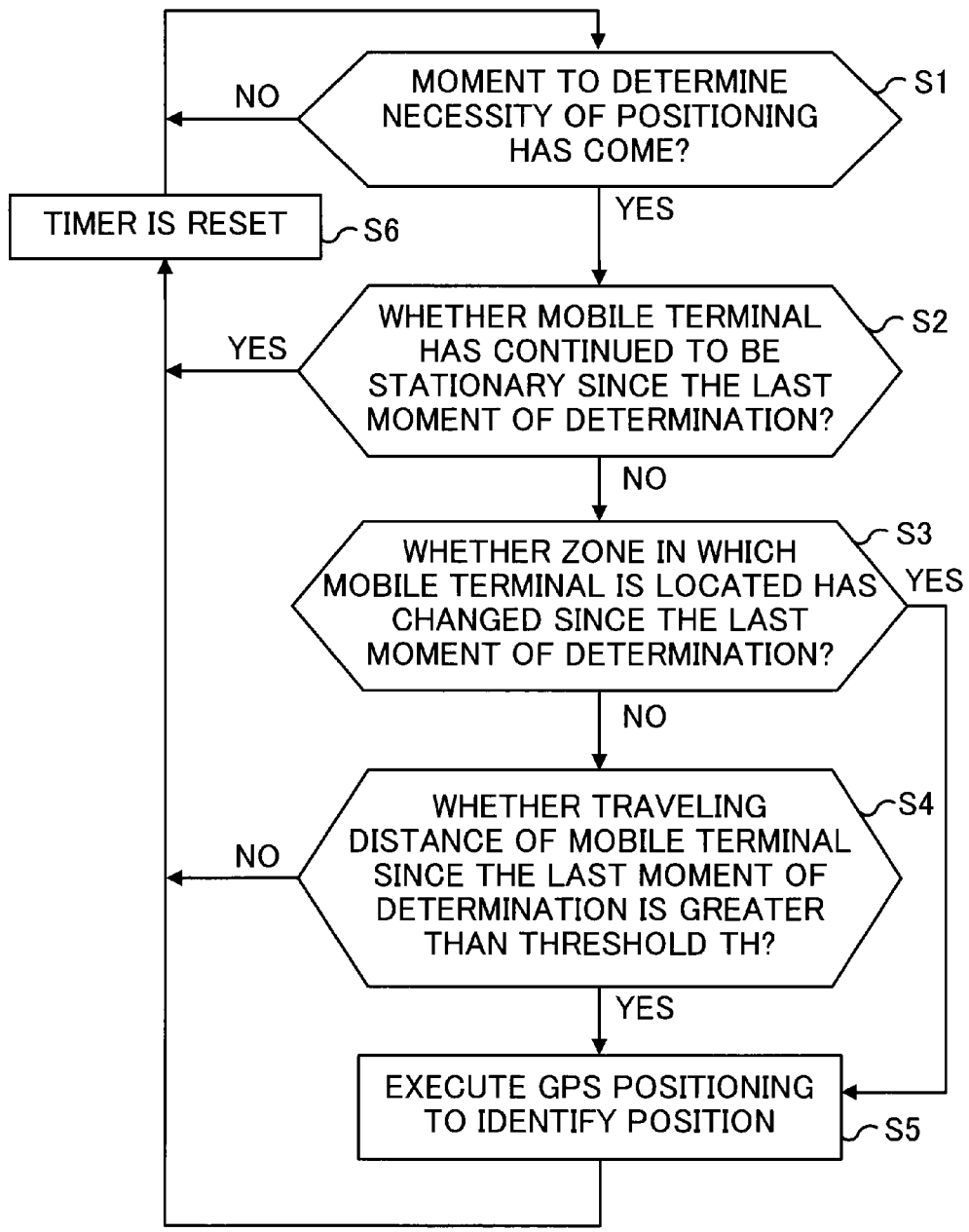
FIG. 3 is a flow chart showing actions of the mobile terminal of the first embodiment.

Subsequently, operations of the mobile terminal 40a will be described with reference to a flow chart in FIG. 3. A CPU in the controller 100 executes computer programs corresponding to the flow chart in FIG. 3 to provide these operations.

In a step S1, the controller 100 decides whether a moment to determine necessity of positioning the mobile terminal 40a has come based on time counted by a timer (not shown). The moment of determination is, for instance, a time point when five minutes have passed since the last moment of determination (step S1). If it is decided that the moment of determination has come, the operation proceeds to step S2. Otherwise, the operation returns to the step S1.

In a step S2, the stationary continuation determiner 110 in the controller 100 determines whether or not the mobile terminal 40a has continued to be stationary since the last moment of determination up to the current time. If it is determined that the mobile terminal 40a has continued to be stationary, the timer for deciding the moment of determination in the step S1 is reset (step S6) and the operation returns to the step S1. That is, in this instance, as the mobile terminal 40a has continued to be stationary since the last moment of determination up to the current time, there is no traveling of the mobile terminal 40a. As a result, the mobile terminal 40a waits for the next moment of determination to come as it is not necessary to execute positioning determination at that moment of determination.

If it is determined that the mobile terminal 40a has not continued to be stationary, the operation proceeds to step S3.

In the step S3, the visited zone change determiner 121 in the controller 100 determines whether or not a zone in which the mobile terminal 40a is located has changed since the last moment of determination up to the current time. If it is determined that the visited zone has changed, the operation proceeds to step S5. That is, in this instance, there is a high probability that the mobile terminal 40a has moved since the last moment of determination up to the current time. Accordingly, as it is necessary to execute positioning determination at this moment of determination, the positioning operation will be executed.

If it is determined that the visited zone is not changed, the operation proceeds to step S4.

In the step S4, the comparison determiner 123 in the controller 100 determines whether or not the traveling distance of the mobile terminal 40a since the last moment of determination up to the current time is greater than the threshold Th, based on the traveling distance of the mobile terminal 40a that the traveling distance calculator 122 has calculated. If it is determined that the traveling distance is equal to or lower than the threshold Th, the timer for deciding the moment of determination in the step S1 is reset (step S6) and the operation returns to the step S1. That is, in this instance, the mobile terminal 40a has moved slightly since the last moment of determination up to the current time. As a result, the mobile terminal 40a waits for the next moment of determination to come as it is not necessary to execute positioning determination at that moment of determination.

If it is determined that the traveling distance is greater than the threshold Th, the operation proceeds to the step S5. That is, in this instance, the mobile terminal 40a has moved over a long distance since the last moment of determination up to the current time. Accordingly, as it is necessary to execute positioning determination at this moment of determination, the positioning operation will be executed.

In the step S5, the controller 100 controls the positioning portion 50 to execute GPS positioning so as to identify the position of the mobile terminal 40a. After completion of the position identification by the positioning portion 50, the timer for deciding the moment of determination in the step S1 is reset (step S6) and the operation returns to the step S1.

According to this embodiment, the positioning portion 50 does not identify the position of the mobile terminal 40a in a case in which it is determined that the mobile terminal 40a has continued to be stationary during the period from the last moment of determination to the current time, without reference to whether or not the visited zone has changed and whether or not the traveling distance during the period is greater than the threshold Th.

As described above, traveling condition is determined under the two criteria, that is, whether the visited zone has changed (step S3) and whether the traveling distance of the mobile terminal is greater than the threshold (step S4). As a result, it is precisely determined that the mobile terminal is in traveling condition, even in a case in which the visited zone has changed, but the mobile terminal has not moved over a long distance, or in a case in which the visited zone is not changed, but the mobile terminal has moved over a long distance.

In general, even if the mobile terminal is completely stationary, there is a case in which the visited zone of the mobile terminal changes (i.e., what is called "flapping" of the visited zone occurs) according to variations of radio wave conditions due to geological formations and terrestrial objects. In such a case, although it is not necessary to execute positioning determination since the mobile terminal has not moved, it is determined that the mobile terminal has moved based on the change of the visited zone and unnecessary positioning determination is executed.

However, according to this embodiment, as the determination result of the stationary continuation determiner has priority over other determination results (step S2), unnecessary positioning determination is not executed, so that power consumption can be reduced. For example, even if the traveling condition determiner including the visited zone change determiner determines that the mobile terminal is in traveling condition due to the flapping, the identification of the mobile terminal is not executed in a case in which the stationary continuation determiner determines that the mobile terminal has continued to be stationary. Consequently, unnecessary positioning determination is not executed, so that power consumption can be reduced.

Even if it is determined that the mobile terminal has not continued to be stationary, the identification of the mobile terminal is not executed in a case in which the visited zone is not changed and in which the traveling distance is lower than the threshold, that is, in a case in which it is not necessary to execute new positioning determination because the traveling distance of the mobile terminal is short. Consequently, unnecessary positioning determination is not executed, so that power consumption of the mobile terminal can be reduced.

Second Embodiment

Next, a second embodiment of the present invention will be described. Note that elements whose actions and functions are equivalent to those of the first embodiment in respective modes illustrated below are identified by the same reference numerals as in the above description, and detailed description thereof is appropriately omitted.

Figure 4:
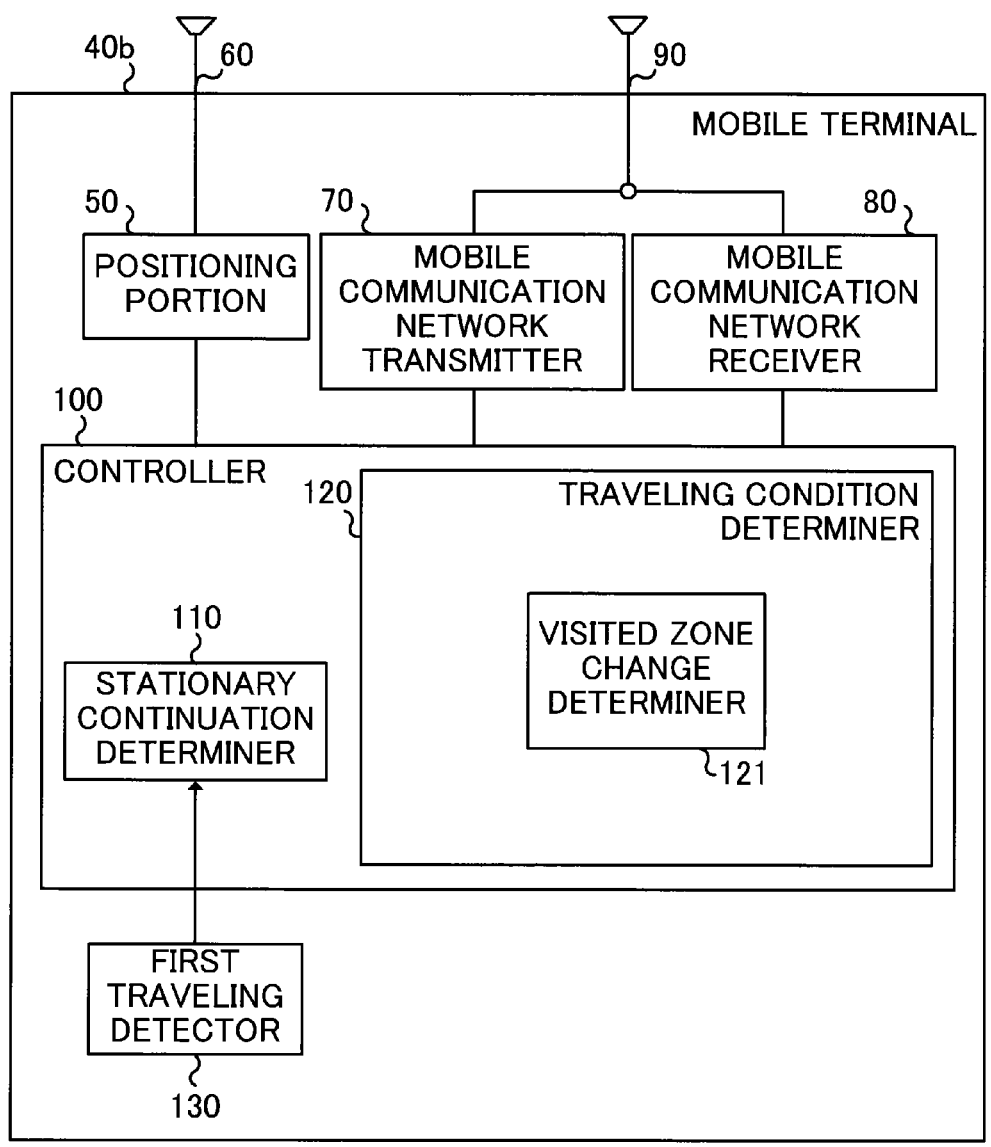
FIG. 4 is a block diagram showing a structure of a mobile terminal of the second embodiment.

FIG. 4 is a block diagram showing a structure of a mobile terminal 40b according to the second embodiment. The mobile terminal 40b is the same as the mobile terminal 40a in the first embodiment, except that the traveling condition determiner 120 includes only the visited zone change determiner 121 and does not includes the traveling distance calculator 122 and the comparison determiner 123 and that the second traveling detector 140 is not included.

In a case in which the stationary continuation determiner 110 determines that the mobile terminal 40b has continued to be stationary during a period including the current time, the controller 100 controls the positioning portion 50 not to identify the position of the mobile terminal 40b. This control is executed without reference to the determination results of the visited zone change determiner 121 in the traveling condition determiner 120.

In a case in which the stationary continuation determiner 110 determines that the mobile terminal 40b has not continued to be stationary during a period including the current time, and in which the visited zone change determiner 121 determines that a cell in which the mobile terminal 40b is located has changed during the period including the current time, that is, in a case in which the traveling condition determiner 120 determines that the mobile terminal 40b is in traveling condition, the controller 100 controls the positioning portion 50 to identify the position of the mobile terminal 40b. The positioning portion 50 receives GPS signals from the GPS satellites 20, identifies the position of the mobile terminal 40b based on the received GPS signals, and supplies the controller 100 with a signal showing the position.

In a case in which the stationary continuation determiner 110 determines that the mobile terminal 40b has not continued to be stationary during a period including the current time, in which the visited zone change determiner 121 determines that a cell in which the mobile terminal 40b is located has not changed during the period including the current time, that is, in a case in which the traveling condition determiner 120 determines that the mobile terminal 40b is in a stationary condition, the controller 100 controls the positioning portion 50 not to identify the position of the mobile terminal 40b.

Figure 5:
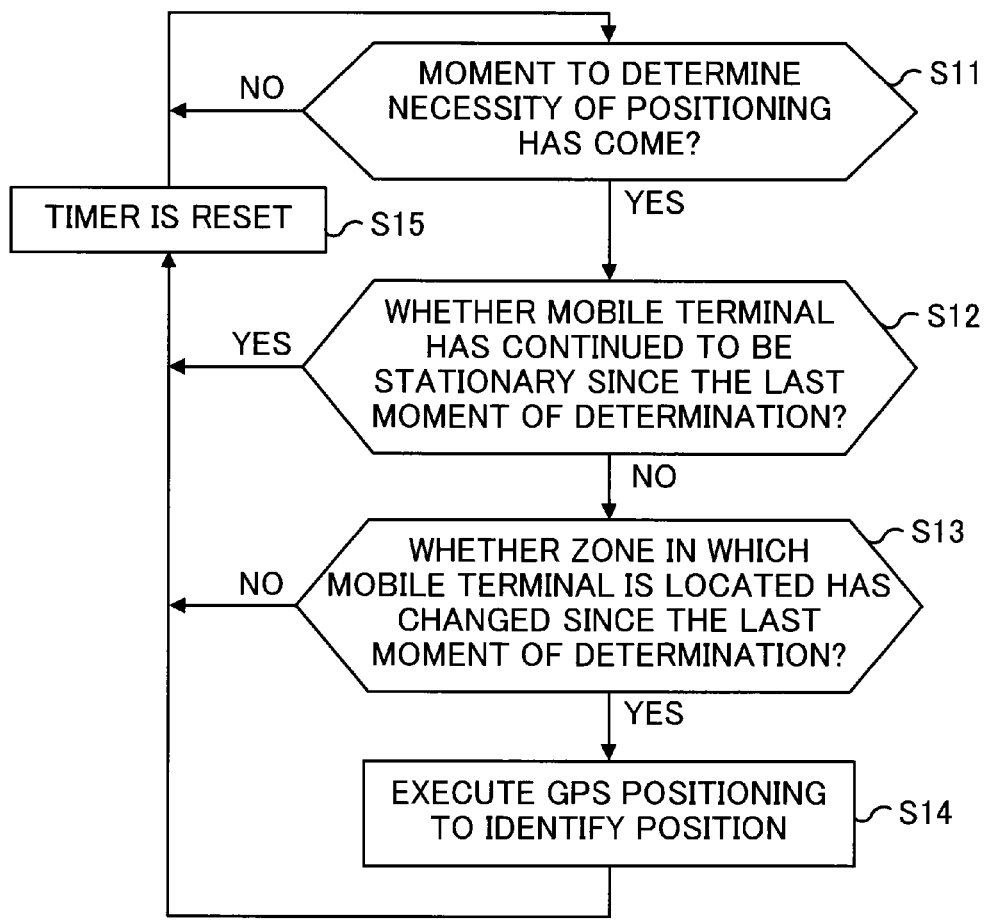
FIG. 5 is a flow chart showing actions of the mobile terminal of the second embodiment.

Subsequently, operations of the mobile terminal 40b will be described with reference to a flow chart of FIG. 5. The CPU in the controller 100 executes computer programs corresponding to the flow chart of FIG. 5 to provide these operations.

In a step S11, the controller 100 decides whether a moment to determine necessity of positioning the mobile terminal 40b has come based on time counted by a timer (not shown). The moment of determination is, for instance, a time point when five minutes have passed since the last moment of determination (step S11). If it is decided that the moment of determination has come, the operation proceeds to step S12. Otherwise, the operation returns to the step S11.

In a step S12, the stationary continuation determiner 110 in the controller 100 determines whether or not the mobile terminal 40b has continued to be stationary since the last moment of determination up to the current time. If it is determined that the mobile terminal 40b has continued to be stationary, the timer for deciding the moment of determination in the step S11 is reset (step S15) and the operation returns to the step S11. That is, in this instance, as the mobile terminal 40b has continued to be stationary since the last moment of determination up to the current time, there is no traveling of the mobile terminal 40b. As a result, the mobile terminal 40b waits for the next moment of determination to come since it is not necessary to execute positioning determination at this moment of determination.

If it is determined that the mobile terminal 40b has not continued to be stationary, the operation proceeds to a step S13.

In the step S13, the visited zone change determiner 121 in the controller 100 determines whether or not a zone in which the mobile terminal 40b is located has changed since the last moment of determination up to the current time. If it is determined that the visited zone has changed, the operation proceeds to a step S14. That is, in this instance, there is a high probability that the mobile terminal 40b has moved since the last moment of determination up to the current time. Accordingly, as it is necessary to execute positioning determination at this moment of determination, the positioning operation will be executed.

If it is determined that the visited zone is not changed, the timer for deciding the moment of determination in the step S11 is reset (step S15) and the operation returns to the step S11. That is, in this instance, there is a high probability that the mobile terminal 40b has not moved since the last moment of determination up to the current time. As a result, the mobile terminal 40b waits for the next moment of determination to come since it is not necessary to execute positioning determination at that moment of determination.

In the step S14, the controller 100 controls the positioning portion 50 to execute GPS positioning so as to identify the position of the mobile terminal 40b. After completion of the position identification by the positioning portion 50, the timer for deciding the moment of determination in the step S11 is reset (step S15) and the operation returns to the step S11.

According to this embodiment, the positioning portion 50 does not identify the position of the mobile terminal 40b in a case in which it is determined that the mobile terminal 40b has continued to be stationary during the period from the last moment of determination to the current time, without reference to whether or not the visited zone has changed.

In general, even if the mobile terminal is completely stationary, there is a case in which the visited zone of the mobile terminal changes (i.e., what is called "flapping" of the visited zone occurs) according to variation of radio wave conditions due to geological formations and terrestrial objects. In such a case, although it is not necessary to execute positioning determination as the mobile terminal has not moved, it is determined that the mobile terminal has moved based on the change of the visited zone and unnecessary positioning determination is executed.

However, according to this embodiment, since the determination result of the stationary continuation has priority over the determination result of the visited zone change (step S12) in such a case, unnecessary positioning determination is not executed, so that power consumption can be reduced. That is, even if the traveling condition determiner including the visited zone change determiner determines that the mobile terminal is in traveling condition due to the flapping, the identification of the mobile terminal is not executed in a case in which the stationary continuation determiner determines that the mobile terminal has continued to be stationary. Consequently, unnecessary positioning determination is not executed, so that power consumption can be reduced.

Third Embodiment

Next, a third embodiment of the present invention will be described. Note that elements having actions and functions equivalent to those of the first embodiment in respective modes illustrated below are identified by the same reference numerals as in the above description, and detailed description thereof is appropriately omitted.

Figure 6:
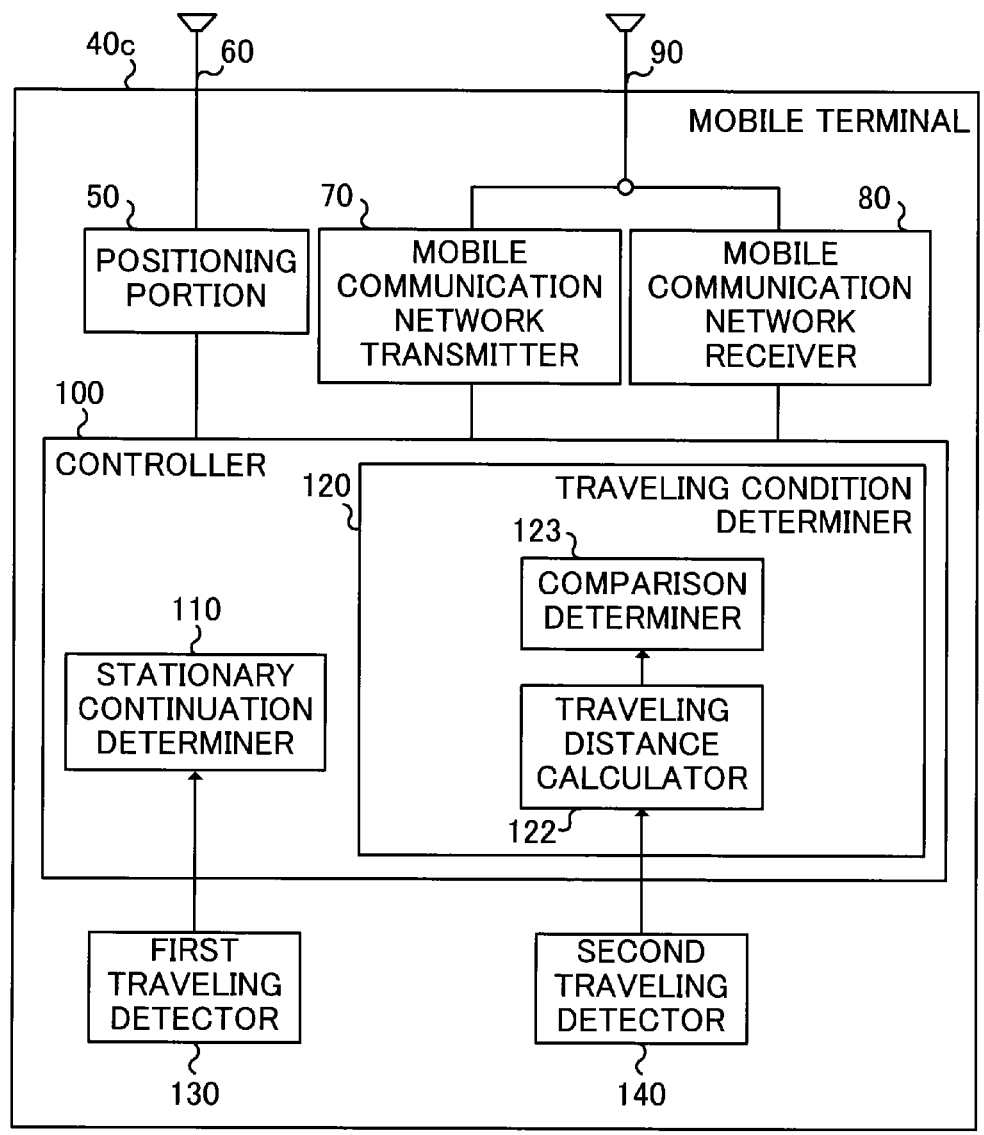
FIG. 6 is a block diagram showing a structure of a mobile terminal of the third embodiment.

FIG. 6 is a block diagram showing a structure of a mobile terminal 40c according to the second embodiment. The mobile terminal 40c is the same as the mobile terminal 40a in the first embodiment, except that the traveling condition determiner 120 includes only the traveling distance calculator 122 and the comparison determiner 123 and does not include the visited zone change determiner 121.

In a case in which the stationary continuation determiner 110 determines that the mobile terminal 40c has continued to be stationary during a period including the current time, the controller 100 controls the positioning portion 50 not to identify the position of the mobile terminal 40c. This control is executed without reference to the determination results of the comparison determiner 123 in the traveling condition determiner 120.

In a case in which the stationary continuation determiner 110 determines that the mobile terminal 40c has not continued to be stationary during a period including the current time, and in which the comparison determiner 123 determines that the traveling distance of the mobile terminal 40c during the period including the current time is greater than the threshold Th, that is, in a case in which the traveling condition determiner 120 determines that the mobile terminal 40c is in traveling condition, the controller 100 controls the positioning portion 50 to identify the position of the mobile terminal 40c. The positioning portion 50 receives GPS signals from the GPS satellites 20, identifies the position of the mobile terminal 40c based on the received GPS signals, and supplies the controller 100 with a signal showing the position.

In a case in which the stationary continuation determiner 110 determines that the mobile terminal 40c has not continued to be stationary during a period including the current time, and in which comparison determiner 123 determines that the traveling distance of the mobile terminal 40c during the period including the current time is equal to or lower than the threshold Th, that is, in a case in which the traveling condition determiner 120 determines that the mobile terminal 40c is in a stationary condition, the controller 100 controls the positioning portion 50 not to identify the position of the mobile terminal 40c.

Figure 7:
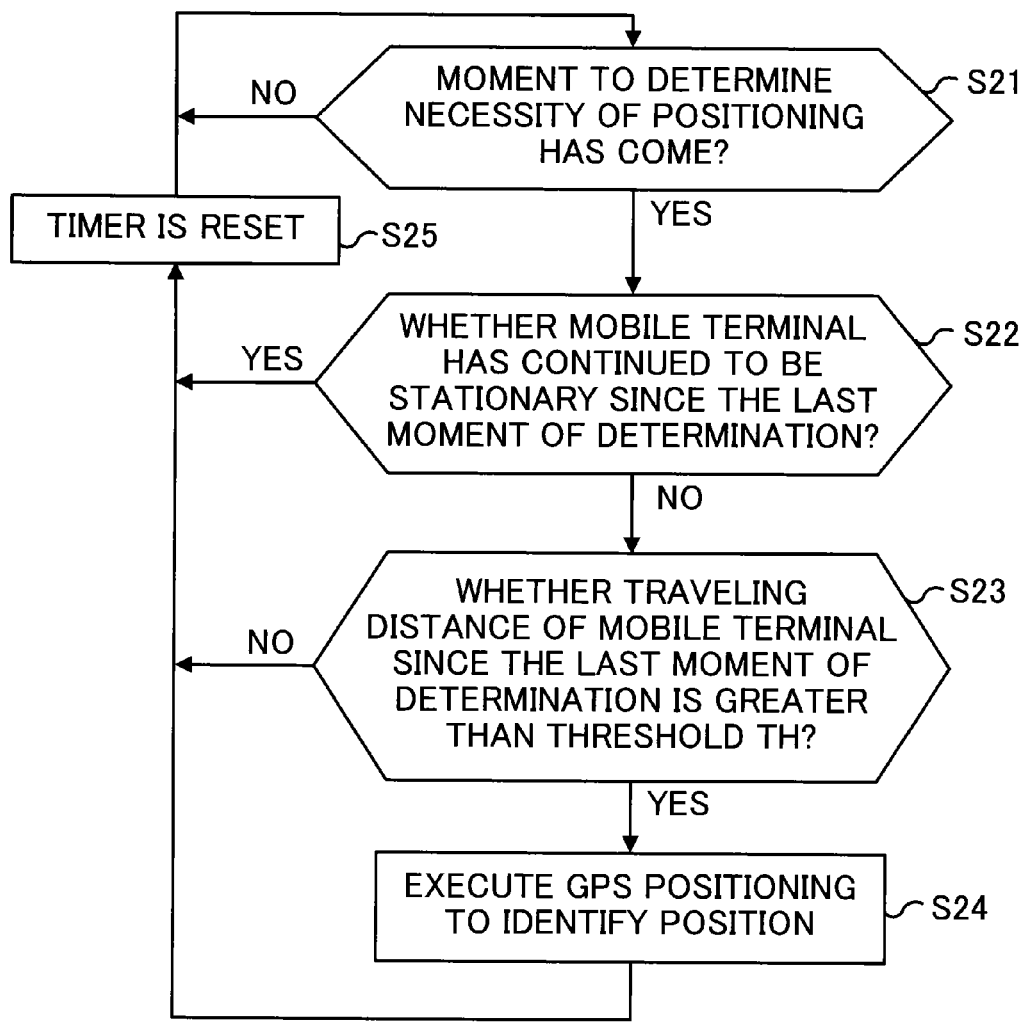
FIG. 7 is a flow chart showing actions of the mobile terminal of the third embodiment.

Subsequently, operations of the mobile terminal 40c will be described with reference to a flow chart in FIG. 7. The CPU in the controller 100 executes computer programs corresponding to the flow chart in FIG. 7 to provide these operations.

In a step S21, the controller 100 decides whether a moment to determine necessity of positioning the mobile terminal 40c has come based on time counted by a timer (not shown). The moment of determination is, for instance, a time point when five minutes have passed since the last moment of determination (step S21). If it is decided that the moment of determination has come, the operation proceeds to step S22. Otherwise, the operation returns to the step S21.

In a step S22, the stationary continuation determiner 110 in the controller 100 determines whether or not the mobile terminal 40c has continued to be stationary since the last moment of determination up to the current time. If it is determined that the mobile terminal 40c has continued to be stationary, the timer for deciding the moment of determination in the step S21 is reset (step S25) and the operation returns to the step S21. That is, in this instance, as the mobile terminal 40c has continued to be stationary since the last moment of determination up to the current time, there is no traveling of the mobile terminal 40c. As a result, the mobile terminal 40c waits for the next moment of determination to come since it is not necessary to execute positioning determination at this moment of determination.

If it is determined that the mobile terminal 40c has not continued to be stationary, the operation proceeds to a step S23.

In the step S23, the comparison determiner 123 in the controller 100 determines whether or not the traveling distance of the mobile terminal 40c since the last moment of determination up to the current time is greater than the threshold Th, based on the traveling distance of the mobile terminal 40c that the traveling distance calculator 122 has calculated. If it is determined that the traveling distance is equal to or lower than the threshold Th, the timer for deciding the moment of determination in the step S21 is reset (step S25) and the operation returns to the step S21. That is, in this instance, the mobile terminal 40c has moved slightly since the last moment of determination up to the current time. As a result, the mobile terminal 40c waits for the next moment of determination to come since it is not necessary to execute positioning determination at that moment of determination.

If it is determined that the traveling distance is greater than the threshold Th, the operation proceeds to the step S24. That is, in this instance, the mobile terminal 40c has moved over a long distance since the last moment of determination. Accordingly, as it is necessary to execute positioning determination at this moment of determination, the positioning operation will be executed.

In the step S24, the controller 100 controls the positioning portion 50 to execute GPS positioning so as to identify the position of the mobile terminal 40c. After completion of the position identification by the positioning portion 50, the timer for deciding the moment of determination in the step S21 is reset (step S25) and the operation returns to the step S21.

According to this embodiment, the positioning portion 50 does not identify the position of the mobile terminal 40c in a case in which it is determined that the mobile terminal 40c has continued to be stationary during the period from the last moment of determination to the current time, without reference to whether or not the traveling distance is greater than the threshold Th.

As described above, as the determination result of the stationary continuation has priority over the determination result of the traveling distance comparison (step S22), it is prevented from determining that the mobile terminal 40c is in traveling condition although the mobile terminal 40c has continued to be stationary since the last moment of determination up to the current time. As a result, unnecessary positioning determination is not executed, so that power consumption can be reduced.

Furthermore, even if it is determined that the mobile terminal has not continued to be stationary, the identification of the mobile terminal is not executed in a case in which the traveling distance is lower than the threshold, that is, in a case in which it is not necessary to execute new positioning determination because the traveling distance of the mobile terminal is short. Consequently, unnecessary positioning determination is not executed, so that power consumption of the mobile terminal can be reduced.

Fourth Embodiment

Figure 8:
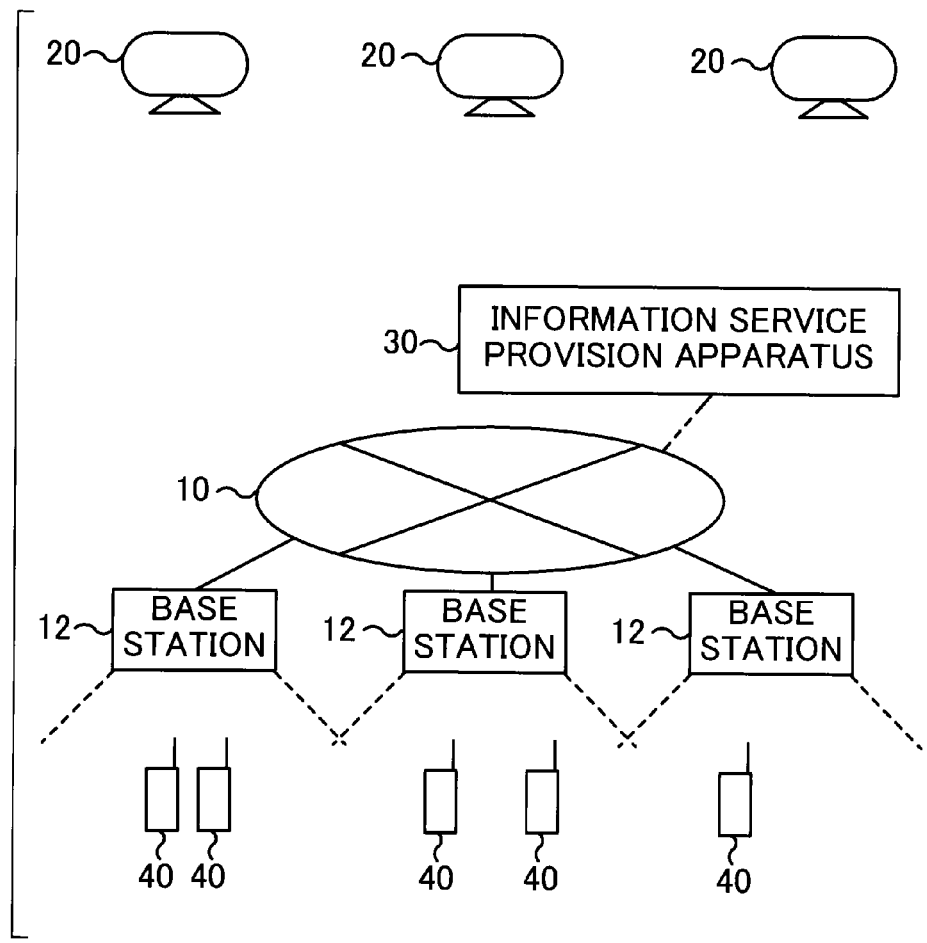
FIG. 8 is a schematic view showing an entire communication system in which a mobile terminal of a fourth embodiment is used.

Next, a fourth embodiment of the present invention will be described. As shown in FIG. 8, an entire communication system in which a mobile terminal according to this embodiment is used includes a mobile communication network 10 and a plurality of mobile terminals 40 capable of communicating with the mobile communication network 10. The mobile communication network 10 includes a plurality of base stations 12, each of which communicates with a mobile terminal 40 located in a cell of the base station.

The mobile terminal 40 in the fourth embodiment may be the mobile terminal 40a in the first embodiment, the mobile terminal 40b in the second embodiment, or the mobile terminal 40c in the third embodiment. A combination of the mobile terminals can be used.

Note that elements having actions and functions equivalent to those of the first to third embodiments in respective modes illustrated below are identified by the same reference numerals as in the first to third embodiments, and detailed description thereof is appropriately omitted.

As shown in FIG. 8, an information service provision apparatus 30 is directly or indirectly connected to the mobile communication network 10. For example, the information service provision apparatus 30 may communicate wirelessly with one of the base stations in the mobile communication network 10. Alternatively, the information service provision apparatus 30 may be connected to another network that is connected to the mobile communication network 10.

The information service provision apparatus 30 is a communication apparatus which an information service provider uses in order to supply a user with information service adjusted to a present position of the user. The single information service provision apparatus 30 is shown in FIG. 8. More than one information service provision apparatus 30 may be installed.

After completion of identifying a present position of the mobile terminal 40 by the positioning portion 50 (step S5, step S14, step S24), the mobile communication network transmitter 70 in the mobile terminal 40 of this embodiment transmits signals showing the present position of the mobile terminal 40 identified by the positioning portion 50 to the information service provision apparatus 30 via the mobile communication network 10 with the antenna 90 under control of the controller 100. The information service provision apparatus 30 searches information adjusted to the present position of the mobile terminal 40 and transmits the obtained information to the mobile terminal 40 via the mobile communication network 10. The mobile communication network receiver 80 in the mobile terminal receives signals showing the information transmitted from the information service provision apparatus 30 with the antenna 90 under control of the controller 100.

As described above, the mobile terminal 40 of this embodiment transmits the signals showing the position of the mobile terminal 40 to the information service provision apparatus 30 only when the positioning portion 50 identifies the position of the mobile terminal based on fulfillment of determination conditions. In contrast, when the positioning portion 50 does not identify the position of the mobile terminal 40, the mobile terminal 40 does not transmit the signals showing the position of the mobile terminal 40 to the information service provision apparatus 30.

As a result, frequency of signal transmission from the mobile terminal 40 to the information service provision apparatus 30 can be reduced, compared to the case in which the signals showing the position are periodically transmitted to the information service provision apparatus 30. Consequently, power consumption of the mobile terminal and traffic loads in the mobile communication network can be reduced.

Other Variations and Modifications

Some embodiments according to the present invention are described above. The following variations and modifications are also in the scope of the present invention.

In the above-described embodiments, each mobile terminal 40 receives time signals from a plurality of the GPS satellites 20 to execute positioning determination and identifies the position of the mobile terminal 40 itself based on these time signals. The present invention is not limited to these configurations. The positioning portion 50 may identify the position of the mobile terminal 40 using signals from a plurality of (e.g., three) base stations. Alternatively, the positioning portion 50 may identify the position of the mobile terminal 40 using signals from one GPS satellite and two base stations. Alternatively, the positioning portion 50 may identify the position of the mobile terminal 40 using signals from two GPS satellites and one base station.

In the above-described embodiments, the zone in which the mobile terminal is located is illustrated by the example of the cell belonging to the base station. Those skilled in the art can easily understand that various types of cells, such as a macro cell, a micro cell, a nano cell, a pico cell, a femto cell, etc., can be included in the above-described cell. Further, the visited zone in the present invention is not limited to a cell, but includes a sector that is a part of a cell divided by a directional antenna.

In the above-described embodiments, the traveling distance calculator 122 counts the number of steps of a user holding the mobile terminal 40a based on acceleration detected by the second traveling detector 140, and calculates the traveling distance by multiplying the number of the steps by a length of the user's stride, which is stored in advance. Alternatively, the traveling distance calculator 122 may execute an integral process based on acceleration detected by the second traveling detector 140 to calculate the traveling distance.

In the above-described embodiments, the threshold Th that is compared with the traveling distance of the mobile terminal 40 is a constant. Alternatively, the controller 100 of the mobile terminal 40 may modify the threshold Th based on the position of the mobile terminal 40 (e.g., the position identified by the positioning portion 50 or the base station to be communicated with). For example, in an urban area including numerous shops and restaurants, the controller 100 may set the threshold Th low so as to increase frequency of positioning determination and notifying of the position of the mobile terminal 40 to the information service provision apparatus 30. In other areas, the controller 100 may set the threshold Th high so as to decrease frequency of positioning determination and notifying of the position of the mobile terminal 40. Another modification is that the base station with which the mobile terminal 40 communicates may transmit an indication of modifying the threshold Th to the mobile terminal 40 and the mobile terminal 40 may modify the threshold Th in accordance with the indication.

In the above-described embodiments, the mobile terminal 40 includes one CPU. Alternatively, the mobile terminal 40 may include a plurality of CPUs which have functions of the positioning portion 50, the mobile communication network transmitter 70, the mobile communication network receiver 80, and the controller 100. Further, the mobile terminal 40 may include a plurality of CPUs that have functions of the stationary continuation determiner 110, the traveling condition determiner 120, the determiner 121, the traveling distance calculator 122, and the comparison determiner 123 which the controller 100 includes.

For example, a C-CPU (Communication Central Processing Unit) may provide functions of the mobile communication network transmitter 70 and the mobile communication network receiver 80, an A-CPU (Application Central Processing Unit) may provide a function of the controller 100, and a CPU of a GPS chip may provide a function of the positioning portion 50.

Further, each function executed by the CPU may be executed by hardware in place of the CPU, for instance, executed by a programmable logic device, such as an FPGA (Field Programmable Gate Array), a DSP (Digital Signal Processor), etc.

Some of the above-described embodiments and variations can be combined with others as long as there is no problem.

DESCRIPTION OF REFERENCE NUMERALS

10 . . . mobile communication network, 12 . . . base station, 20 . . . GPS satellite, 30 . . . information service provision apparatus, 40 . . . mobile terminal, 50 . . . positioning portion, 60 . . . positioning antenna, 70 . . . mobile communication network transmitter, 80 . . . mobile communication network receiver, 90 . . . mobile communication network antenna, 100 . . . controller, 110 . . . stationary continuation determiner, 120 . . . traveling condition determiner, 121 . . . visited zone change determiner, 122 . . . traveling distance calculator, 123 . . . comparison determiner, 130 . . . first traveling detector, 140 . . . second traveling detector.

The invention claimed is:

1. A mobile terminal comprising:
    a positioning portion configured to identify a position of the mobile terminal repetitively;
    a stationary continuation determiner configured to determine whether or not the mobile terminal has continued to be stationary during a period including a current time depending on whether a traveling sensor is in a sleep state or not; and
    a traveling condition determiner configured to determine whether the mobile terminal is in a stationary condition or is in a traveling condition,
    wherein the positioning portion does not identify the position of the mobile terminal, without reference to a determination result of the traveling condition determiner, in a case in which the stationary continuation determiner determines that the mobile terminal has continued to be stationary during the period,
    wherein the positioning portion identifies the position of the mobile terminal in a case in which the stationary continuation determiner determines that the mobile terminal has not continued to be stationary during the period and in which the traveling condition determiner determines that the mobile terminal is in a traveling condition,
    wherein the positioning portion does not identify the position of the mobile terminal in a case in which the traveling condition determiner determines that the mobile terminal is in a stationary condition even in a case in which the stationary continuation determiner determines that the mobile terminal has not continued to be stationary during the period.

2. The mobile terminal of claim 1,
    the traveling condition determiner comprising:
    a visited zone change determiner configured to determine whether or not a visited zone in which the mobile terminal is located has changed during the period;
    a traveling distance calculator configured to calculate a traveling distance of the mobile terminal during the period; and
    a comparison determiner configured to determine whether or not the traveling distance that the traveling distance calculator has calculated is greater than a threshold,
    wherein the positioning portion identifies the position of the mobile terminal in a case in which the stationary continuation determiner determines that the mobile terminal has not continued to be stationary during the period; and in which the visited zone change determiner determines that the visited zone in which the mobile terminal is located has changed during the period or in which the comparison determiner determines that the traveling distance during the period is greater than the threshold,
    wherein the positioning portion does not identify the position of the mobile terminal in a case in which the stationary continuation determiner determines that the mobile terminal has not continued to be stationary during the period, in which the visited zone change determiner determines that the visited zone in which the mobile terminal is located is not changed during the period, and in which the comparison determiner determines that the traveling distance during the period is equal to or lower than the threshold.

3. The mobile terminal of Claim 2, wherein the comparison determiner only makes a determination on whether or not the traveling distance during the period is greater than the threshold when the visited zone change determiner determines that the visited zone in which the mobile terminal is located is not changed during the period.

4. The mobile terminal of claim 1,
the traveling condition determiner comprising:
a visited zone change determiner configured to determine whether or not a visited zone in which the mobile terminal is located changes during the period,
wherein the positioning portion identifies the position of the mobile terminal in a case in which the stationary continuation determiner determines that the mobile terminal has not continued to be stationary during the period and in which the visited zone change determiner determines that the visited zone in which the mobile terminal is located changes during the period,
wherein the positioning portion does not identify the position of the mobile terminal in a case in which the stationary continuation determiner determines that the mobile terminal has not continued to be stationary during the period and in which the visited zone change determiner determines that the visited zone in which the mobile terminal is located is not changed during the period.

5. The mobile terminal of claim 1,
the traveling condition determiner comprising:
a traveling distance calculator configured to calculate a traveling distance of the mobile terminal during the period; and
a comparison determiner configured to determine whether or not the traveling distance that the traveling distance calculator has calculated is greater than a threshold,
wherein the positioning portion identifies the position of the mobile terminal in a case in which the stationary continuation determiner determines that the mobile terminal has not continued to be stationary during the period and in which the comparison determiner determines that the traveling distance during the period is greater than the threshold,
wherein the positioning portion does not identify the position of the mobile terminal in a case in which the stationary continuation determiner determines that the mobile terminal has not continued to be stationary during the period and in which the comparison determiner determines that the traveling distance during the period is equal to or lower than the threshold.

6. The mobile terminal of claim 1, further comprising:
a receiver configured to receive information which an information service provision apparatus sends to the mobile terminal via a mobile communication network, the information adjusted to a present position of the mobile terminal; and
a transmitter configured to repetitively transmit a signal which represents the position of the mobile terminal which the positioning portion has identified to the information service provision apparatus,
wherein the transmitter does not transmit the signal that represents the position of the mobile terminal to the information service provision apparatus in a case in which the positioning portion does not identify the position of the mobile terminal.

7. The mobile terminal of Claim 1, further comprising:
a timer, wherein a moment for determining a necessity of positioning the mobile terminal is based on a time counted down by the timer since the previous moment of determining the necessity of positioning the mobile terminal.

8. A control method for a mobile terminal, comprising:
identifying a position of the mobile terminal repetitively;
determining whether or not the mobile terminal has continued to be stationary during a period including current time depending on whether a traveling sensor is in a sleep state or not;
determining whether the mobile terminal is in a stationary condition or is in a traveling condition;
not identifying the position of the mobile terminal, without reference to a result of a determination as to whether the mobile terminal is in stationary condition or is in a traveling condition, in a case in which it is determined that the mobile terminal has continued to be stationary during the period;
identifying the position of the mobile terminal in a case in which it is determined that the mobile terminal has not continued to be stationary during the period and in which it is determined that the mobile terminal is in traveling condition; and
not identifying the position of the mobile terminal in a case in which it is determined that the mobile terminal is in a stationary condition even in a case in which it is determined that the mobile terminal has not continued to be stationary during the period.

* * * * *

UNITED STATES PATENT AND TRADEMARK OFFICE
CERTIFICATE OF CORRECTION

PATENT NO. : 8,812,025 B2  Page 1 of 1
APPLICATION NO. : 13/634277
DATED : August 19, 2014
INVENTOR(S) : Makoto Takahashi et al.

It is certified that error appears in the above-identified patent and that said Letters Patent is hereby corrected as shown below:

In the Claims

Col. 18, Claim 6, lines 11-15, replace "wherein the transmitter does not transmit the signal that represents the position of the mobile terminal to the information service provision apparatus in a case in which the positioning portion does not identify the position of the mobile terminal" with --wherein the transmitter does not transmit the signal that represents the position of the mobile terminal to the information service provision apparatus in a case in which the positioning portion does not identify the position of the mobile terminal, wherein the transmitter transmits the signal that represents the position of the mobile terminal to the information service provision apparatus in a case in which the positioning portion identifies the position of the mobile terminal--.

Signed and Sealed this
Seventeenth Day of February, 2015

Michelle K. Lee
*Deputy Director of the United States Patent and Trademark Office*